US011043668B2

United States Patent
Oh et al.

(10) Patent No.: US 11,043,668 B2
(45) Date of Patent: Jun. 22, 2021

(54) SILICON OXIDE COMPOSITE FOR LITHIUM SECONDARY BATTERY NEGATIVE ELECTRODE MATERIAL AND METHOD FOR MANUFACTURING THE SAME

(71) Applicant: Daejoo Electronic Material Co., Ltd., Siheung-si (KR)

(72) Inventors: Seung Min Oh, Siheung-si (KR); Jang Han Kim, Siheung-si (KR); Daeun Kim, Siheung-si (KR)

(73) Assignee: Daejoo Electronic Material Co., Ltd., Gyeonggi-do (KR)

( * ) Notice: Subject to any disclaimer, the term of this patent is extended or adjusted under 35 U.S.C. 154(b) by 298 days.

(21) Appl. No.: 15/471,355

(22) Filed: Mar. 28, 2017

(65) Prior Publication Data

US 2018/0269475 A1    Sep. 20, 2018

(30) Foreign Application Priority Data

Mar. 20, 2017    (KR) .......................... 10-2017-0034857

(51) Int. Cl.
| | |
|---|---|
| *H01M 4/36* | (2006.01) |
| *H01M 4/62* | (2006.01) |
| *H01M 4/485* | (2010.01) |
| *H01M 4/1395* | (2010.01) |
| *H01M 4/38* | (2006.01) |
| *H01M 4/1391* | (2010.01) |
| *H01M 4/48* | (2010.01) |
| *H01M 4/04* | (2006.01) |

(Continued)

(52) U.S. Cl.
CPC ......... *H01M 4/366* (2013.01); *H01M 4/0428* (2013.01); *H01M 4/1391* (2013.01); *H01M 4/1395* (2013.01); *H01M 4/364* (2013.01); *H01M 4/386* (2013.01); *H01M 4/483* (2013.01); *H01M 4/485* (2013.01); *H01M 4/625* (2013.01); *H01M 10/0525* (2013.01); *H01M 2004/027* (2013.01)

(58) Field of Classification Search
CPC ....................................................... H01M 4/00
See application file for complete search history.

(56) References Cited

U.S. PATENT DOCUMENTS

| | | | |
|---|---|---|---|
| 2016/0372753 A1 | 12/2016 | Fukasawa et al. | |
| 2017/0149059 A1* | 5/2017 | Dutta ..................... | H01M 4/386 |
| 2018/0090750 A1* | 3/2018 | Oh ........................ | H01M 4/1395 |

FOREIGN PATENT DOCUMENTS

| | | | | |
|---|---|---|---|---|
| EP | 3 136 477 A1 | 3/2017 | | |
| KR | 101586816 B1 * | 1/2016 | .......... | H01M 4/1395 |

OTHER PUBLICATIONS

The Extended European Search Report for the European Application No. 17163308.4 dated Nov. 27, 2017.

* cited by examiner

Primary Examiner — James Lee
(74) Attorney, Agent, or Firm — Kelly & Kelley, LLP

(57) ABSTRACT

A silicon oxide composite for a secondary battery negative electrode material and a method for manufacturing the same, more particularly, a silicon oxide composite for a secondary battery negative electrode material and a method for manufacturing the same are disclosed. The silicon oxide composite includes $MgSiO_3$ (enstatite) crystals and silicon particles, of which crystal size is from 1 to 25 nm, in a silicon oxide ($SiO_x$, $0<x<2$), and a carbon film placed on a surface.

11 Claims, 3 Drawing Sheets

(51) Int. Cl.
*H01M 10/0525* (2010.01)
*H01M 4/02* (2006.01)

SILICON OXIDE COMPOSITE FOR LITHIUM SECONDARY BATTERY NEGATIVE ELECTRODE MATERIAL AND METHOD FOR MANUFACTURING THE SAME

CROSS-REFERENCE TO RELATED APPLICATIONS

A claim for priority under 35 U.S.C. § 119 is made to Korean Patent Application No. 10-2017-0034857 filed Mar. 20, 2017, in the Korean Intellectual Property Office, the entire contents of which are hereby incorporated by reference.

BACKGROUND

Embodiments of the inventive concept described herein relate to a silicon oxide composite for a lithium secondary battery negative electrode material and a method of manufacturing the same, and more particularly, relate to a silicon oxide composite for a secondary battery negative electrode material, where the surface including crystals of $MgSiO_3$ (enstatite) and/or $MgSiO_4$ (foresterite), and silicon particles in a silicon oxide (SiOx, 0<x<2) is clad with carbon, by reacting a $Si/SiO_2$ raw material powder mixture with a metallic magnesium in a vapor sate, and a method for manufacturing the silicon oxide composite.

As the necessity of secondary batteries is standing out for miniaturization and high performance of portable devices and even in the industries of electric vehicles and large capacity energy storage, demands for improving performance of lithium secondary batteries are increasing nowadays. To increase energy density, researches and developments are progressing for large capacity of positive and negative active materials, high densification of electrode plates, characterization of thin film for separating films, and elevation of charge/discharge voltages. However, since characterization of thin films, high densification of electrode plates, and elevation of charge/discharge voltages may cause problems fatal to stability of secondary batteries, the researches and developments are encountering technical limits at present and for that reason, are now going toward the direction of increasing capacities of positive and negative active materials. Especially, there are reports about negative active materials which may have capacities equal to or larger than several times as large as a theoretical capacity 372 mAh/g of an existing graphite group.

Carbon, silicon, tin, and transition metal series are mainly studied for negative active materials of the lithium secondary batteries. Nevertheless of those studies, negative active materials developed until the present are still insufficient to the desired levels of capacity, initial charge/discharge efficiency, expansion rate, and lifetime characteristics, and therefore there are many issues to be improved.

Especially, since a material, such as Si, Ge, or Sn which is included in the IV-group semiconductor materials, has large theoretical capacity, it is spotlighted as a new negative electrode material. Specifically, silicon has large-capacity performance, for which its theoretical capacity reaches 4,200 mAh/g, and therefore is spotlighted as a next generation material for replacing a carbon negative electrode material.

However, although silicon has large capacity because the alloy is formed with high capacity by accommodating 4.4 lithium atoms in a silicon atom, it causes volume variation equal to or higher than about 300%. This volume variation generates pulverization of a negative active material during continuation of charge and discharge, and causes electrical deionization of the negative active material from a current collector. This electrical deionization remarkably reduces a capacity maintaining rate of the battery.

To improve such a problem, although there is proposed even a technique of complicating silicon and carbon through a mechanical milling process and cladding silicon particle surfaces with a carbon layer by using a Chemical Vapor Deposition (CVD) (Patent Document 1), it has a limit to controlling volume expansion and contraction accompanied with charge/discharge. Differently, although a silicon oxide (SiOx) is smaller than silicon in capacity, the silicon oxide has large capacity (about 1,500 mAh/g) equal to or larger than several times of negative electrode capacity (about 350 mAh/g) of carbon series and is therefore spotlighted as a material, which is innovatively improved in the characteristics of volume expansion rate and lifetime (a capacity maintaining rate), in a structure where silicon nano-crystals are uniformly distributed over a silicon dioxide matrix.

However, with a silicon oxide excellent in lifetime and capacity as such, a lithium oxide (including a lithium oxide and a lithium silicic acid) is generated through a reaction of lithium and silicon oxide during initial charge and prohibited reversibly to enter a positive electrode during discharge. There has been a problem that such non-reversible reaction exhausts lithium, drops Initial Charge/discharge Efficiency (ICE) down to 75%, and offsets large capacity per unit mass of a negative electrode in a practical battery because it is necessary to have excessive capacity of a positive electrode in designing a secondary battery.

For improving initial charge/discharge efficiency of a silicon oxide ($SiO_x$), there is a method of manufacturing a $Si$—$SiO_x$—$Li$ series complex by reacting $SiO_x$ with a metallic lithium powder (Patent Document 2). This method improves the initial charge/discharge efficiency, but battery capacity is reduced, the stability of a paste is degraded in manufacturing electrodes, and industrial production is difficult due to inconvenience of treatment.

As such, there is proposed a method of increasing initial charge/discharge efficiency though a silicon-silicon oxide composite by mixing and heating a compound of $SiO_x$ and magnesium in order to increase the stability in manufacturing electrodes.

While Patent Document 3 manufactured a $Si$—$SiO_2$—$Mg_2SiO_4$-carbon series composite by reacting $SiO_2$ with magnesium nitrate ($Mg(NO_3)O_2$), its discharge capacity resulted in 900 mAh/g and initial charge/discharge efficiency resulted in 73% as a low level. This result may be regarded as that the charge/discharge capacity is low equal to or smaller than an expectable level and a non-reversible reaction is out of control because an amorphous $SiO_2$ and $MgO$ are affluently contained during a reaction with $SiO_2$ since magnesium nitrate is used for magnesium precursors.

Additionally, to reduce the non-reversibility of $SiO_2$, there is reported a method of manufacturing a silicon-silicon oxide composite which contains magnesium or calcium by reacting a $SiO_2$ powder with magnesium hydride ($MgH_2$) or calcium hydride ($CaH_2$) (Patent Document 4). This method reduced a degree of mixed introduction of oxygen during a reaction of the $SiO_2$ powder with the $MgH_2$ or $CaH_2$, but a capacity maintaining rate with respect to $SiO_2$ resulted in dropping because Mg or Ca was ununiformly distributed and a silicon crystal size abruptly grew up due to a local exothermic reaction.

PRIOR ART DOCUMENTS

Patent Documents

Japanese Patent Publication No. 2000-215887
Japanese Patent Publication No. 2007-294423
Japanese Patent Publication No. 2010-170943
Japanese Patent Publication No. 2012-033317

SUMMARY

Embodiments of the inventive concept, for solving the problem of a silicon oxide composite for a general secondary battery negative electrode material as described above, provide a silicon oxide composite for a lithium secondary battery negative electrode material, the silicon oxide composite being improved in charge/discharge capacity, initial charge/discharge efficiency, and capacity maintaining rate when the silicon oxide composite is used in the battery negative electrode material, by manufacturing the silicon oxide composite where a silicon oxide includes silicon particles, and crystals of $MgSiO_3$ (enstatite) and $Mg_2SiO_4$ (foresterite) crystals and then by cladding the surface with a carbon material.

According to an aspect of an embodiment, a silicon oxide composite for a secondary battery negative electrode material includes an $MgSiO_3$ (enstatite) crystal and a silicon particle, of which crystal size is from 1 to 25 nm, in a silicon oxide (SiOx, 0<x<2), and a carbon film placed on a surface.

The silicon oxide composite may further include an $Mg_2SiO_4$ (foresterite) crystal.

The silicon oxide composite for the secondary battery negative electrode material may include $Mg_2SiO_4$ and MgO, whereas it may be preferred to form a practical composition with Si and $MgSiO_3$ crystals in order to improve charge/discharge capacity and initial charge/discharge efficiency.

in X-ray diffraction pattern analysis, the silicon oxide composite for the secondary battery negative electrode material may appeared with a peak belonging to a Si crystal may appear in a range of a diffraction angle 28°<2θ<29°, and a peak belonging to a $MgSiO_3$ crystal may appear in a range of a diffraction angle 30.5°<2θ<31.5°.

In the silicon oxide composite for the secondary battery negative electrode material, Mg weight per part by the total 100 weight may be contained in a ratio of 2 to 20 in part by weight.

In the silicon oxide composite for the secondary battery negative electrode material, carbon per part by the total 100 weight may be contained in a ratio of 1 to 20 in part by weight.

In the silicon oxide composite for the secondary battery negative electrode material, an average thickness of the carbon film may be from 5 to 100 nm.

In the silicon oxide composite for the secondary battery negative electrode material, the carbon film may include one or more selected from a group of a carbon nanofiber, a graphene, a graphene oxide, and a reduced graphene oxide.

In the silicon oxide composite for the secondary battery negative electrode material, specific gravity of the silicon oxide composite may be from 2.3 to 3.2 and may be preferred to have 2.4 to 2.7 because $MgSiO_3$ larger than SiOx in specific gravity is included therein, and it may be preferred to use an active material, which has large specific gravity, for improving energy density of the secondary battery if in the same capacity.

In the silicon oxide composite for the secondary battery negative electrode material, an average particle diameter of the silicon oxide composite may be from 0.1 to 15 μm. It may be more preferred for an average particle diameter of the silicon oxide composite to be 1 to 10 μm.

In the silicon oxide composite for the secondary battery negative electrode material, a specific surface area of the silicon oxide composite may be from 1 to 40 m²/g. It may be preferred for a specific surface area of the silicon oxide composite to be 3 to 30 m²/g.

According to another aspect of the inventive concept, a method for manufacturing a silicon oxide composite for a secondary battery negative electrode material includes preparing a $Si/SiO_2$ raw material powder mixture by mixing a silicon powder and a silicon dioxide powder, forming the silicon oxide composite by evaporating and depositing the $Si/SiO_2$ raw material powder mixture and metallic magnesium, cooling the formed silicon oxide composite, milling the cooled silicon oxide composite, and cladding a surface of the milled silicon oxide composite with carbon.

In the method for manufacturing the silicon oxide composite for the secondary battery negative electrode material, the silicon powder may have an average particle diameter from 1 to 50 μm, preferably 2 to 20 μm. In the method for manufacturing the silicon oxide composite for the secondary battery negative electrode material, the silicon dioxide powder may have an average particle diameter from 10 to 100 nm, preferably 10 to 50 nm.

In the method for manufacturing the silicon oxide composite for the secondary battery negative electrode material, the $Si/SiO_2$ raw material powder mixture may be made in a ratio of 0.8 to 1 mol of the silicon dioxide powder with respect to 1 mol of the silicon powder.

In the method for manufacturing the silicon oxide composite for the secondary battery negative electrode material, the evaporating of the $Si/SiO_2$ raw material powder mixture and the metallic magnesium may be performed by heating the $Si/SiO_2$ raw material powder mixture and the metallic magnesium at 800 to 1,600° C. under pressure from 0.01 to 2 torr, preferably at 800 to 1,600° C. under pressure from 0.1 to 1 torr, more preferably at 1,200 to 1,500° C. under pressure from 0.1 to 1 torr.

The metallic magnesium may be a magnesium lump or a magnesium powder, preferably a metallic magnesium lump.

In the method for manufacturing the silicon oxide composite for the secondary battery negative electrode material, particles evaporated by the heating may be processed in a chemical reaction as follows through reaction/condensation.

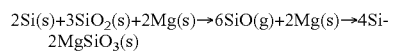

$2Si(s)+3SiO_2(s)+2Mg(s) \rightarrow 6SiO(g)+2Mg(s) \rightarrow 4Si\text{-}2MgSiO_3(s)$ According to embodiments of the inventive concept, it is possible to improve a capacity maintaining rate by synthesizing a silicon oxide composite through a uniform vapor reaction of particles which are evaporated from heating a $Si/SiO_2$ raw material mixture and Mg together, and by preventing abrupt growth of silicon due to an exothermic reaction while Mg is mixed overly and locally as like a solid reaction.

In the method for manufacturing the silicon oxide composite for the secondary battery negative electrode material, the cooling may include cooling the formed silicon oxide composite to room temperature through one of cooling with a water-cooled substrate, natural cooling, and other cooling manners.

In the method for manufacturing the silicon oxide composite for the secondary battery negative electrode material, the milling may include milling the cooled silicon oxide composite to have an average particle diameter from 0.1 to 15 μm.

In the method for manufacturing the silicon oxide composite for the secondary battery negative electrode material, the cladding of the surface of the milled silicon oxide composite with the carbon may include reacting the silicon oxide composite with one or more kinds of carbon precursors, which are selected from a group of methane, propane, butane, acetylene, benzene, and toluene, at 600 to 1,200° C. in a gaseous state.

Additionally, embodiments of the inventive concept may provide a silicon oxide composite for a secondary battery negative electrode material, which is manufactured by a method according to the inventive concept.

As another aspect of the inventive concept, a lithium secondary battery negative electrode may include a silicon oxide composite for a secondary battery negative electrode material manufactured by a method according to the inventive concept. The lithium secondary battery negative electrode including a silicon oxide composite for a secondary battery negative electrode material may be formed only of the silicon oxide composite or formed in a mixed form with a carbon material.

As another aspect of the inventive concept, a lithium secondary battery may include a lithium secondary battery negative electrode including a silicon oxide composite for a secondary battery negative electrode material according to the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinbelow, embodiments of the inventive concept will be described in detail, but the inventive concept may not be restricted in these embodiments.

<Embodiment 1> Manufacturing Si—$MgSiO_3$—SiOx-C Series Silicon Oxide Composite

Operation (1): After putting 8 kg of a silicon powder, of which average particle size is 20 μm, and 16 kg of a silicon dioxide powder, of which average particle size is 20 nm, into 50 kg of water and uniformly mixing them by agitation for 12 hours, a raw material powder mixture was formed through drying for 24 hours at 200° C.

Operation (2): After putting 2 kg of metallic magnesium and the raw material powder mixture respectively into crucible A and crucible B of a vacuum reactor and reducing pressure of the crucibles to 0.1 torr, crucible A was heat up to 1500° C. and crucible B was heat up to 900° C. in reaction for 5 hours.

Operation (3): A silicon oxide composite lump, which was deposited on a substrate in a reactor through high temperature vapor reaction, was cooled down to room temperature.

Operation (4): The silicon oxide composite lump was milled through a mechanical process for controlling its particle size and an average particle size became 6 μm.

Operation (5): A silicon oxide composite, of which surface is clad with carbon, was manufactured by putting 50 g of the milled silicon oxide composite powder into a tube-type electric furnace and maintaining a state of flowing argon and methane gas respectively by 1 l/min for one hour at 900° C.

Experimental Example

Analyzing by Transmission Electron Microscope (TEM)

Figure 1:
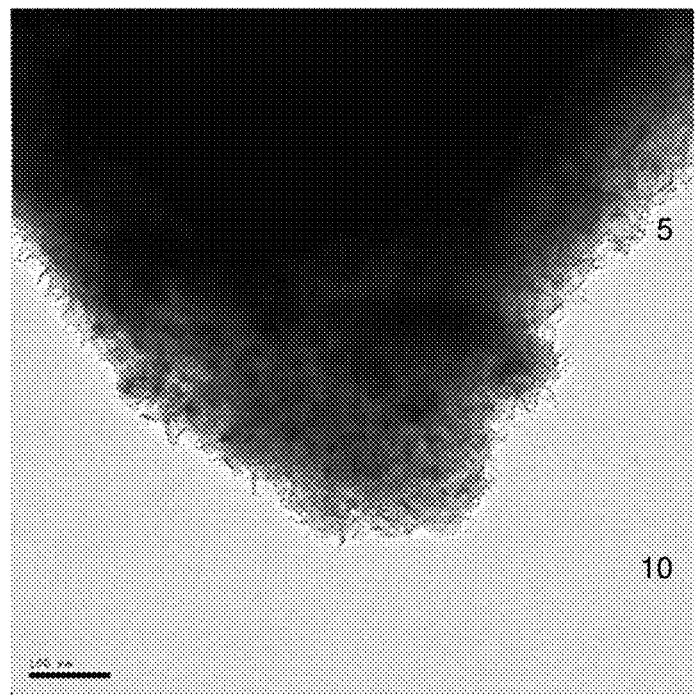
FIG. 1 shows a photograph of Transmission Electron Microscope (TEM) of a negative active material where the surface of a silicon oxide composite according to Embodiment 1 of the inventive concept are clad with carbon, from which it may be seen that the surface of the silicon oxide composite is clad with a graphene-shaped carbon layer and a carbon nanofibers having a thickness of several tens nanometers.

For analyzing the surface of the silicon oxide composite manufactured through Embodiment 1, a TEM was used for the analysis and a result of the analysis is shown in FIG. 1.

As shown in FIG. 1, it may be seen that the surface of the manufactured silicon oxide composite is clad with a carbon layer which has a thickness of several tens of nanometers and is shaped in carbon nanofiber and graphene.

Experimental Example

Analyzing Content and Specific Gravity of Component Elements

Herein was analyzed content of each component element of magnesium (Mg), oxygen (O), and carbon (C) in the silicon oxide composite manufactured through Embodiment 1.

Content of magnesium (Mg) in the silicon oxide composite was analyzed as 11 wt % through Inductively Coupled Plasma (ICP) luminance spectroscopy, and each content of oxygen (O) and carbon (C) was analyzed as 30 wt % and 5 wt %, respectively, by an elemental analyzer.

Additionally, specific gravity was analyzed as 2.5 by a pycnometer for powder, which was larger than specific gravity of SiO, 2.2, but lower than specific gravity of $MgSiO_3$, 2.7, or specific gravity of $Mg_2SiO_4$, 3.2.

Experimental Example

Measuring Average Particle Size

An average particle size (particle diameter) of the powder manufactured through Embodiment 1 was defined as an average weight value $D_{50}$ (median diameter or particle diameter or median diameter until an accumulated weight reaches 50% of the total weight) in particle size distribution measurement by laser light diffraction and measured as $D_{50}=2.5$ μm.

Experimental Example

Analyzing X-Ray Diffraction Pattern

Figure 2:
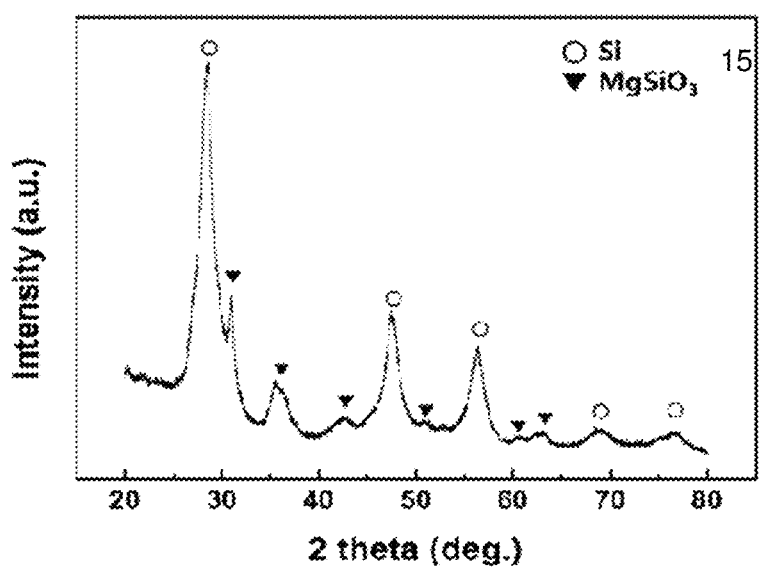
FIG. 2 shows an X-ray diffraction pattern of a silicon oxide composite negative active material according to Embodiment 1 of the inventive concept. It may be seen from FIG. 2 that a peak belongs to a Si crystal in the vicinity of a diffraction angle 2θ of 28.5° and a peak belongs to a $MgSiO_3$ crystal in the vicinity of the diffraction angle 2θ of 31.0°.

For analyzing a crystal structure of the silicon oxide composite manufactured through Embodiment 1, an X-ray diffraction pattern was analyzed and a result of the analysis was shown in FIG. 2.

As shown in the X-ray diffraction pattern of FIG. 2, from the result appearing such that a peak belongs to a Si crystal in the vicinity of a diffraction angle 2θ that is 28.5° and a peak belongs to a $MgSiO_3$ crystal in the vicinity of a diffraction angle 2θ that is 31.0°, it may be seen that the silicon oxide composite manufactured through the Embodiment 1 is formed of crystalline materials Si and $MgSiO_3$.

Additionally, as shown in the X-ray diffraction pattern of FIG. 2, it may be seen, from content of each element in the silicon oxide composite, that an amorphous silicon oxide (SiOx) and carbon are also contained therein.

A Si crystal size of the obtained silicon oxide composite was analyzed as 9 nm by the Sherrer equation that is expressed in General Formula 1 based on Full Width at Half Maximum (FWHM) of a peak belonging to Si[111] in the X-ray diffraction pattern.

$$C.S. [nm]=K\cdot\lambda/B\cdot\cos\theta \qquad \text{General Formula 1}$$

In the General Formula 1, K=0.9, λ=0.154 nm, B=FWHM (rad),
and θ=peak position (angle)

<Embodiment 2> Manufacturing Si—$MgSiO_3$—$MgSiO_4$—SiOx-C Series Silicon Oxide Composite A silicon oxide composite powder was manufactured in the same manner with Embodiment 1 except that a silicon oxide composite lump deposited on a substrate in Embodiment 1 was naturally cooled by a substrate which is free from water-cooling.

Experimental Example

Analyzing Content Of Component Element

This experiment was performed to analyze content of each component element of magnesium, oxygen, and carbon in the silicon oxide composite manufactured through the Embodiment 2.

Content of Mg of the silicon oxide composite was analyzed as 10 wt % through the ICP luminance spectroscopy, and content of oxygen and content of carbon were analyzed respectively as 31 wt % and 6 wt %. Additionally, specific gravity was analyzed as 2.6 by a pycnometer for powder. This specific gravity was analyzed as being larger than SiO's specific gravity 2.2 but smaller than $MgSiO_3$'s specific gravity 2.7 or $Mg_2SiO_4$'s specific gravity 3.2.

Experimental Example

Measuring Average Particle Diameter

An average particle diameter (particle diameter) of the powder manufactured through Embodiment 2 was measured as $D_{50}=2.5$ μm through a laser diffraction method.

Experimental Example

Analyzing X-Ray Diffraction Pattern

Figure 3:
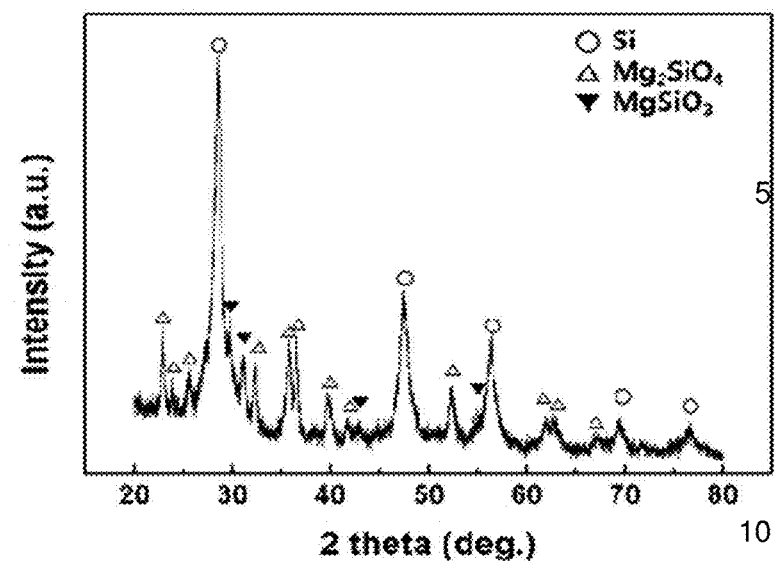
FIG. 3 shows an X-ray diffraction pattern of a silicon oxide composite negative active material according to Embodiment 2 of the inventive concept. It may be seen from FIG. 3 that a peak belongs to a Si crystal in the vicinity of a diffraction angle 2θ of 28.5°, a peak belongs to a $Mg_2SiO_4$ crystal in the vicinity of the diffraction angle 2θ of 22.9°, and a peak belongs to a $Mg_2SiO_4$ crystal in the vicinity of the diffraction angle 2θ of 31.0°.

An X-ray diffraction pattern was analyzed to know a crystal structure of the silicon oxide composite manufactured through Embodiment 2 and a result of the analysis is shown in FIG. 3.

As shown in FIG. 3, a crystal structure of the manufactured silicon oxide composite appeared with a peak belonging to a Si crystal in the vicinity of a diffraction angle 2θ 28.5°, a peak belonging to a $Mg_2SiO_4$ crystal in the vicinity of a diffraction angle 2θ 22.9°, and a peak belonging to a $MgSiO_3$ crystal in the vicinity of a diffraction angle 2θ 31.0°. It may be seen that the crystal structure of the silicon oxide composite is formed of crystal structures of Si, $Mg_2SiO_4$, and $MgSiO_3$.

Additionally, from the content of element components of the silicon oxide composite, it could be seen that an amorphous silicon oxide (SiOx) and carbon were also contained in the silicon oxide composite.

A crystal size of Si of the obtained silicon oxide composite was analyzed as 10 nm through the Sherrer equation by applying FWHM to a peak belonging to Si[111] of the X-lay diffraction pattern.

<Comparison 1> Manufacturing Si—$SiO_2$-C Series Silicon Oxide

A silicon oxide (SiOx) of which surface was clad with carbon was manufactured in the same manner with Embodiment 1 except that in Embodiment 1, 2 kg of metallic magnesium was put into crucible "B" and crucible "B" was heat up to 900° C.

Experimental Example

Analyzing Content Of Component Element

This experimental example analyzed content of each component element of magnesium, oxygen, and carbon of the silicon oxide manufactured through Comparison 1.

Content of oxygen and content of carbon in the silicon oxide were analyzed respectively as 35 wt % and 5 wt %. Additionally, specific gravity was analyzed as 2.2 by a pycnometer for powder and was equivalent with the SiO's specific gravity 2.2.

Experimental Example

Measuring Average Particle Diameter

An average particle diameter (particle diameter) of the powder manufactured through Comparison 1 was measured as $D_{50}$=6.5 μm through a laser diffraction method.

Experimental Example

Analyzing X-Ray Diffraction Pattern

Figure 4:
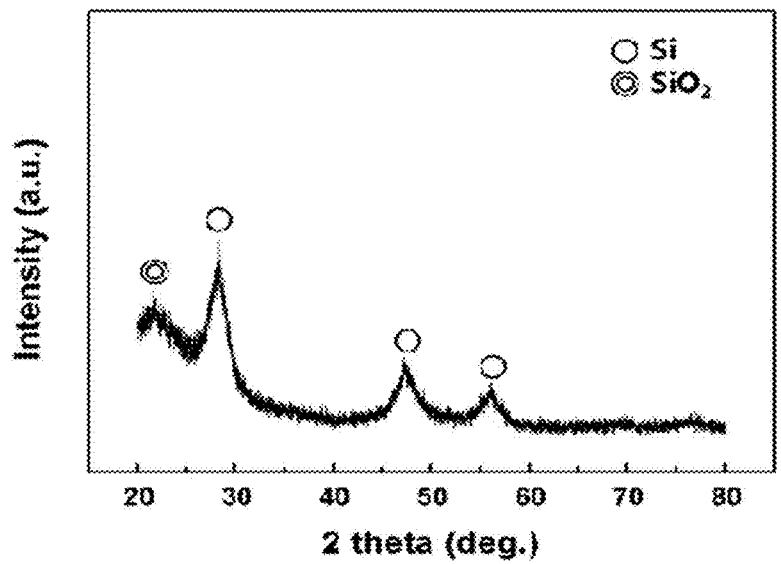
FIG. 4 shows an X-ray diffraction pattern of a silicon oxide (SiOx) negative active material obtained from Comparison 1. It may be seen from FIG. 4 that a peak belongs to a Si crystal in the vicinity of a diffraction angle 2θ of 28.5° and a slow peak belongs to a $SiO_2$ crystal in the vicinity of the diffraction angle 2θ of 22.0°.

An X-ray diffraction pattern was analyzed to know a crystal structure of the silicon oxide composite manufactured through Comparison 1 and a result of the analysis is shown in FIG. 4.

As shown by the X-ray diffraction pattern in FIG. 4, a crystal structure of the manufactured silicon oxide composite appeared with a peak belonging to a Si crystal in the vicinity of a diffraction angle 2θ 21.9° and a slow peak belonging to a $SiO_2$ crystal in the vicinity of a diffraction angle 2θ 21.9°, from which it may be seen that the crystal structure of the silicon oxide composite is formed of crystal structures of Si, $SiO_2$, and carbon.

A crystal size of Si of the obtained silicon oxide composite was analyzed as 5 nm through the Sherrer equation by applying FWHM for a peak belonging to Si[111] of the X-ray diffraction pattern.

<Comparison 2> Manufacturing Si—$MgSiO_4$—SiOx-C Series Silicon Oxide Composite

A silicon oxide composite powder was manufactured in the same manner with Embodiment 1 except that a silicon oxide composite lump deposited on a substrate in Embodiment 1 was slowly cooled by an insulated substrate.

Experimental Example

Analyzing Content Of Component Element

This experimental example analyzed content of each component element of magnesium, oxygen, and carbon of the silicon oxide composite manufactured through Comparison 2.

Magnesium content of the manufactured silicon oxide composite was analyzed as 12 wt % through ICP luminance spectroscopy, and oxygen content and carbon content were analyzed respectively as 30 wt % and 4 wt %. Additionally, specific gravity was analyzed as 2.7 by a pycnometer for powder and was larger than SiO's specific gravity 2.2 but smaller than $Mg_2SiO_4$'s specific gravity 3.2.

Experimental Example

Measuring Average Particle Diameter

An average particle diameter (particle diameter) of the powder manufactured through Comparison 2 was measured as $D_{50}$=2.8 μm through a laser diffraction method.

Experimental Example

Analyzing X-Ray Diffraction Pattern

Figure 5:
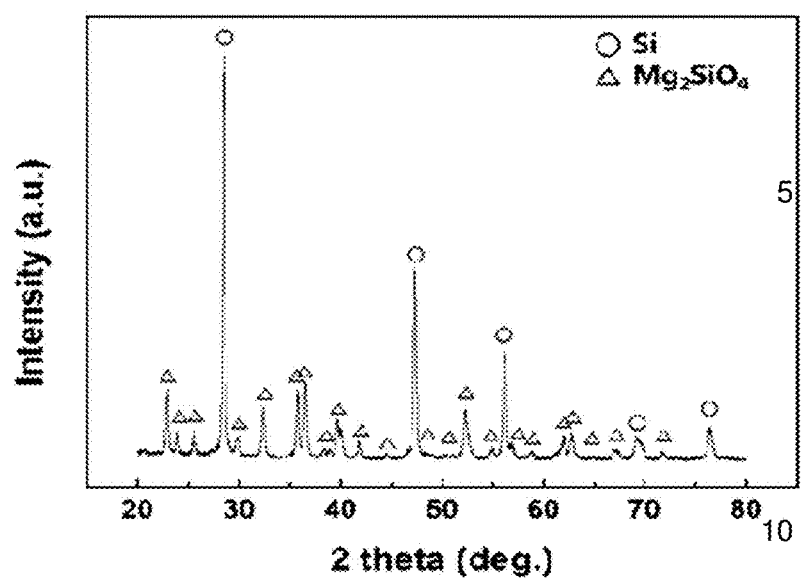
FIG. 5 shows an X-ray diffraction pattern of a silicon oxide composite negative active material obtained from Comparison 2. It may be seen from FIG. 5 that a peak belongs to a Si crystal in the vicinity of a diffraction angle 2θ of 28.5° and a peak belongs to a $Mg_2SiO_4$ crystal in the vicinity of the diffraction angle 2θ of 22.9°.
Figure 6:
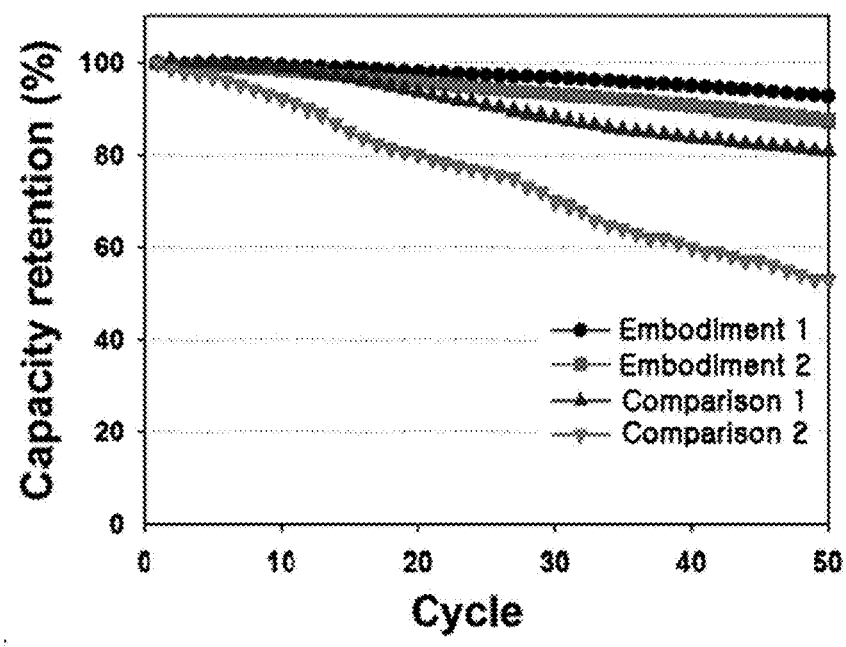
FIG. 6 shows a result of measuring capacity maintaining rates of batteries including negative active materials obtained from comparison examples and embodiments of the inventive concept.

An X-ray diffraction pattern was analyzed to know a crystal structure of the silicon oxide composite manufactured through Comparison 2 and a result of the analysis is shown in FIG. 5.

As shown by the X-ray diffraction pattern in FIG. 4, a crystal structure of the silicon oxide composite manufactured through Comparison 1 appeared with a peak belonging to a Si crystal in the vicinity of a diffraction angle 2θ 28.5° and a peak belonging to a $Mg_2SiO_4$ crystal in the vicinity of a diffraction angle 2θ 22.9°, from which it may be seen that the crystal structure of the silicon oxide composite is formed of crystal structures of Si and $Mg_2SiO_4$. Different from embodiments, a peak of $MgSiO_3$ was not found.

Additionally, it may be seen from each content of the silicon oxide composite that an amorphous silicon oxide (SiOx) and carbon are partly contained in the silicon oxide composite.

A crystal size of Si of the obtained silicon oxide composite was analyzed as 20 nm through the Sherrer equation by applying FWHM for a peak belonging to Si[111] of the X-lay diffraction pattern.

Manufacturing Example

Manufacturing Lithium Secondary Battery to which Silicon Oxide Composite is Applied A battery (coin cell) and a lithium secondary battery negative electrode as an electrode active material were manufactured by mixing the silicon oxide composite powder, which is manufactured through Embodiment 1 or 2, or Comparison 1 or 2, and natural graphite in a weight ratio of 73:27.

Then, negative electrode slurry was manufactured by mixing the mixed active material, binder carboxy methyl cellulose (CMC), and styrene butadiene rubber (SBR), which were blended in a weight ratio of 97:1.5:1.5, with water.

An electrode was manufactured in a thickness of 70 μm by coating the composite on a copper foil with a thickness of 18 μm and drying it. A negative electrode for a coin cell was manufactured by punching the electrode-coated copper foil in a circular form having a diameter of 14 mm. The opposite electrode was manufactured by using a metallic lithium foil having a thickness of 0.3 mm.

A separating film was made by using a porous polyethylene sheet having a thickness of 0.1 mm and an electrolyte was made by dissolving LiPF6, which has concentration of 1M, in a solution in which ethylene carbonate (EC) and diethylene carbonate (DEC) are mixed in a volume ratio of 1:1. A coin cell (battery) was manufactured in a thickness of 2 mm and a diameter of 32 mm (so-called "2032 type") by using the configuration elements.

Experimental Example

Evaluating Electrochemical Characteristics

Charge capacity (mAh/g), discharge capacity (mAh/g), and initial charge/discharge efficiency (%) were obtained by charging the coin cell, which was manufactured every sample through the aforementioned manufacturing example, with a static current of 0.1C until a voltage reaches 0.005 V and by discharging the coin cell with a static current 0.1C until a voltage reaches 2.0 V.

Additionally, after once charging and discharging the coin cell manufactured every sample through the aforementioned manufacturing example, the cycle characteristics (capacity maintaining rate) was obtained by charging the coin cell with a static current 0.5C until a voltage reaches 0.005 V and by discharging the coin cell with a static current 0.5C until a voltage reaches 2.0 V.

The charge and discharge capacities, the initial charge/discharge efficiency, and the capacity maintaining rate are summarized in Table 1 as follows.

TABLE 1

| | XRD crystal phase | Initial charge capacity (mAh/g) | Initial discharge capacity (mAh/g) | Initial charge/ discharge efficiency (mAh/g) | Capacity maintaining rate (%) after 50 cycles |
|---|---|---|---|---|---|
| Embodiment 1 | Si + MgSiO$_3$ | 703 | 640 | 91 | 92 |
| Embodiment 2 | Si + MgSiO$_3$ + Mg$_2$SiO$_4$ | 710 | 630 | 89 | 87 |
| Comparison 1 | Si + SiO$_2$ | 724 | 620 | 85 | 80 |
| Comparison 2 | Si + Mg$_2$SiO$_4$ | 695 | 597 | 86 | 53 |

As shown from Table 1, the discharge capacity in a silicon oxide composite, which was formed of crystalline Si and MgSiO$_3$ and manufactured through Embodiment 1, appeared 640 mAh/g, the initial charge/discharge efficiency resulted in an excellent level as 91%, and the capacity maintaining rate after 50 cycles was high as 92%. From this result, it may be seen that the initial charge/discharge efficiency is improved by removing non-reversible factors, while maintaining high discharge capacity of the silicon oxide (SiOx), in virtue of a Si—MgSiO$_3$—SiOx-C series negative electrode active material manufactured through reaction of Si, SiO$_2$, and Mg.

The silicon oxide (SiOx) manufactured without magnesium in Comparison 1 had initial charge/discharge efficiency of 85% that was lower than that of the silicon oxide composite of Comparison 2 or Embodiment 1 or 2 which included MgSiO$_3$ or Mg$_2$SiO$_4$.

It may be seen that Mg$_2$SiO$_4$ of the silicon oxide composite manufactured through Comparison 2 resulted in reducing discharge capacity and initial charge/discharge efficiency, with respect to MgSiO$_3$ of the silicon oxide composite manufactured through Embodiment 1 or 2, and in having a poor capacity maintaining rate that is 53%.

According to embodiments of the inventive concept, it is possible to manufacture a non-aqueous electrolyte lithium secondary battery with a silicon oxide composite negative active material which improves charge/discharge capacity, increases initial charge/discharge efficiency, and improves a capacity maintaining rate.

According to embodiments of the inventive concept, it is possible to improve a capacity maintaining rate by synthesizing a silicon oxide composite through a uniform vapor reaction of particles which are evaporated from heating a Si/SiO$_2$ raw material mixture and Mg together, and by preventing abrupt growth of silicon due to an exothermic reaction while Mg is mixed overly and locally as like a solid reaction.

Additionally, it is possible for a method of manufacturing a silicon oxide composite according to embodiments of the inventive concept to improve capacity per unit weight by efficiently removing Mg$_2$SiO$_4$ (foresterite) and MgSiO$_3$ (enstatite), which are non-reversible materials of silicon oxides, with a small amount of Mg by further generating MgSiO$_3$ (enstatite) more than Mg$_2$SiO$_4$ (foresterite).

Embodiments of the inventive concept are exemplarily described above, and it may be understood by those skilled in the art that other practical modifications are easily allowable without altering technical spirits or essential features of the inventive concept. Therefore, the embodiments described above should be construed as being exemplified any way, in all aspects of the inventive concept, and as not being restrictive thereto. For example, each element described as a single type may be implemented even in a form of plurality or multiplicity and reversely, elements described in plurality or multiplicity may be implemented in a combination form.

The scope of the inventive concept may be included in the appended claims as follows. The meaning and range of the appended claims, and all alterations and modifications derived from the equivalents thereof may be construed as being included in the scope of the inventive concept.

What is claimed is:

1. A silicon oxide composite for a secondary battery negative electrode material, the silicon oxide composite comprising:
    (a) a silicon oxide (SiOx, 0<x<2), and
    (b) a carbon film on a surface of the silicon oxide,
    in which (a) the silicon oxide (SiOx, 0<x<2) includes;
    (i) an MgSiO$_3$ (enstatite) crystal; and
    (ii) a silicon particle with a crystal size of from 1 to 25 nm; and
    wherein the MgSiO3 (enstatite) crystals and silicon particles are uniformly mixed inside the silicon oxide (SiOx, 0<x<2), and
    wherein the silicon oxide does not include Mg$_2$SiO$_4$ (forsterite) crystal, or when Mg$_2$SiO$_4$ (forsterite) crystal is futher included, the content of the Mg$_2$SiO$_4$ (forsterite) crystal is smaller than the content of the MgSiO$_3$ (enstatite) crystal.

2. The silicon oxide composite of claim 1, wherein in X-ray diffraction pattern analysis, a peak belonging to a Si crystal appears in a range of a diffraction angle 28°<2θ<29°, and wherein a peak belonging to a MgSiO$_3$ crystal appears in a range of a diffraction angle 30.5°<2θ<31.5°.

3. The silicon oxide composite of claim 1, wherein Mg weight per part by the total silicon oxide composite 100 weight is contained in a ratio of 2 to 20 in part by weight.

4. The silicon oxide composite of claim 1, wherein carbon per part by the total silicon oxide composite 100 weight is contained in a ratio of 1 to 20 in part by weight.

5. The silicon oxide composite of claim 1, wherein an average thickness of the carbon film is from 5 to 100 nm.

6. The silicon oxide composite of claim 1, wherein the carbon film includes one or more selected from a group of a carbon nanofiber, a graphene, a graphene oxide, and a reduced graphene oxide.

7. The silicon oxide composite of claim 1, wherein specific gravity of the silicon oxide composite is from 2.3 to 3.2.

8. The silicon oxide composite of claim 1, wherein an average particle diameter of the silicon oxide composite is from 0.1 to 15 μm.

9. The silicon oxide composite of claim 1, wherein a specific surface area of the silicon oxide composite is from 1 to 40 m$^2$/g.

10. A lithium secondary battery negative electrode comprising a silicon oxide composite for a secondary battery negative electrode material of claim 1.

11. A lithium secondary battery comprising a lithium secondary battery negative electrode including a silicon oxide composite for a secondary battery negative electrode material of claim 10.

\* \* \* \* \*